(12) United States Patent
Crosby et al.

(10) Patent No.: US 8,906,284 B2
(45) Date of Patent: Dec. 9, 2014

(54) WRINKLED ADHESIVE SURFACES AND METHODS FOR THE PREPARATION THEREOF

(75) Inventors: Alfred J. Crosby, Amherst, MA (US); Edwin P. Chan, Montgomery Village, MD (US); Ryan C. Hayward, Northampton, MA (US)

(73) Assignee: The University of Massachusetts, Boston, MA (US)

( * ) Notice: Subject to any disclaimer, the term of this patent is extended or adjusted under 35 U.S.C. 154(b) by 963 days.

(21) Appl. No.: 12/464,306

(22) Filed: May 12, 2009

(65) Prior Publication Data

US 2009/0297776 A1    Dec. 3, 2009

Related U.S. Application Data

(60) Provisional application No. 61/056,585, filed on May 28, 2008.

(51) Int. Cl.
*B29C 35/02* (2006.01)
*C09J 7/02* (2006.01)
*B29C 33/38* (2006.01)
*B29C 33/42* (2006.01)
*B29L 31/00* (2006.01)

(52) U.S. Cl.
CPC ............. *C09J 7/021* (2013.01); *B29C 33/3842* (2013.01); *B29C 33/424* (2013.01); *B29L 2031/756* (2013.01); *C09J 2201/28* (2013.01)
USPC ....................................................... 264/340

(58) Field of Classification Search
USPC ....................................................... 264/340
See application file for complete search history.

(56) References Cited

U.S. PATENT DOCUMENTS

| | | |
|---|---|---|
| 5,286,338 A | 2/1994 | Feldblum et al. |
| 5,599,624 A | 2/1997 | Prochazka |
| 6,608,726 B2 | 8/2003 | Legrand et al. |
| 6,836,384 B2 | 12/2004 | Legrand et al. |
| 6,893,941 B2 | 5/2005 | Suda |
| 6,987,258 B2 | 1/2006 | Mates |
| 7,019,671 B2 | 3/2006 | Kawai |
| 7,161,736 B2 | 1/2007 | Legrand et al. |

(Continued)

FOREIGN PATENT DOCUMENTS

WO        WO 01/49776        7/2001

OTHER PUBLICATIONS

Chan ("Adhesion of patterned polymer interfaces" (Sep. 1, 2007). Electronic Doctoral Dissertations for UMass Amherst. Paper AAI3289211).*

(Continued)

*Primary Examiner* — Larry Thrower
(74) *Attorney, Agent, or Firm* — Cantor Colburn LLP

(57) ABSTRACT

A wrinkled adhesive surface is prepared by swelling a laterally confined elastomer layer with a polymerizable monomer composition. Swelling the elastomer layer spontaneously produces a wrinkled surface, and the wrinkles are then stabilized by polymerizing the polymerizable monomer composition. The stabilized wrinkled surfaces prepare by the method can exhibit substantially enhanced adhesion relative to smooth surfaces of the same material. The stabilized wrinkled surfaces can also exhibit adhesion that is repeatable through many cycles of contact with and separation from another surface. The adhesive characteristics of the stabilized wrinkled surfaces can be tailored by manipulating the size of the wrinkles.

27 Claims, 8 Drawing Sheets

Step 1. Preparation of an adhesive rigid substrate that provides the lateral confinement Step 2. External stimuli to develop compressive stress ◄ compression Step 3. A wrinkled adhesive develops due to lateral confinement and compression

(56) References Cited

U.S. PATENT DOCUMENTS

| | | | |
|---|---|---|---|
| 7,195,733 | B2 | 3/2007 | Rogers et al. |
| 7,251,292 | B2 | 7/2007 | Kandiar |
| 7,335,271 | B2 | 2/2008 | Autumn |
| 7,622,367 | B1 | 11/2009 | Nuzzo et al. |
| 7,625,598 | B2 | 12/2009 | Sharma et al. |
| 2005/0069676 | A1 | 3/2005 | Nakamura et al. |
| 2005/0196068 | A1 | 9/2005 | Kawai |
| 2005/0208432 | A1 | 9/2005 | Conley, Jr. et al. |
| 2006/0236721 | A1 | 10/2006 | Franck |
| 2009/0297776 | A1 | 12/2009 | Crosby et al. |

OTHER PUBLICATIONS

Southern et al., J. Polym. Sci., Part A: Polym. Chem. 1965, vol. 3, pp. 641-646.
Tanaka et al., Mechanical instability of gels at the phase transition, Nature, vol. 325, Feb. 26, 1987, 796-798.
Bowden et al., Spontaneous formation of ordered structures in thin films of metals supported on an elastomeric polymer, Nature 1998, vol. 393, p. 146-149.
Autumn et al., Adhesive force of a single gecko foot-hair, Nature 2000, vol. 405, p. 681-685.
Huck et al., Ordering of Spontaneously Formed Buckles on Planar Surfaces, Languir 2000, vol. 16, p. 3497-3501.
Jagota et al., Mechanics of AdhesionThrought a Fibrillar Microstructure, Integr. Comp. Biol. 2002, vol. 42, p. 1140-1145.
Cerda et al., Geometry and Physics of Wrinkling, Physical Review Letters 2003, vol. 9, 074302-1-074302-4.
Geim et al., Microfabricated adhesive mimicking gecko foot-hair, Nature Materials 2003, vol. 2, No. 7, p. 461-463.
Gorb et al., Ontogenesis of the attachment ability in the bug Coreus marginatus (Heteropeter, Insecta), The Journal of Experimental Biology 2004, vol. 207, p. 2917-2924.
Crosby et al., Controlling Polymer Adhesion with "Pancakes", Languir 2005, vol. 21, pp. 11738-11743.
Segalman, Patterning with Block Copolymer thin films, Materials Science and Engineering R: Reviews, 2005, vol. 48, pp. 191-226.
Sun et al., Bioinspired Surfaces with Special Wettability, Account of Chemical Research 2005, vol. 38, p. 644-652.
Chan et al., Soft Matter 2006, vol. 2, pp. 324-328.
Thomas et al., Controlling Adhesion with Surface Hole Patterns, Journal of Adhesion 2006, vol. 82, p. 311-329.
Khang, et al., A Stretchable Form of Single-Crystal Silicon for High-Performance Electronics on Rubber Substrates, Science 2006, vol. 311, pp. 208-212.
Jeong, et al., Biologically Inspired Artificial Compound Eyes, Science 2006, vol. 312, pp. 557-561.
Harrison et al., Applied Physics Letters, 2004, vol. 85, No. 18, pp. 4016-4018.
Stafford et al., Nature Materials, 2004, vol. 3, pp. 545-550.
Chua, et al., Applied Physics Letters, 2000, vol. 76, pp. 721-723.
Bowden et al., Applied Physics Letters, 1999, vol. 75, pp. 2557-2559.
Efimenko et al., Nature Materials, 2005, vol. 4 pp. 293-297.
Kwon et al., Physical Review E, 2005, vol. 71, pp. 11601-11604.
Hayward et al., Macromolecules, 2005, vol. 38, pp. 7768-7783.
Matsuo et al., Nature 1992, vol. 358, pp. 482-484.
Efimenko et al., Journal of Colloid and Interface Science, 2002, vol. 254, pp. 306-315.
Zhao et al., Progress in Polymer Science, vol. 25, Jun. 2000, pp. 677-710.
Johnson, Photonic Crystals: Periodic Surprises in Electromagnetism (Apr. 2003), 29 pages.
Jeon et al., Nano Letters, 2005, vol. 5, pp. 1351-1356.
Wilkinson et al., J. Vac. Sci. Technol. B, 1998, vol. 16, pp. 3132-3126.
Yamato et al., Biomaterials, 2002, vol. 23, pp. 561-567.
Lee et al., Inspirations from Biological Optics for Advanced Photonic Systems, Science, 2005, vol. 310, pp. 1148-1150.
Hillborg et al., Langmuir, 2004, vol. 20, pp. 785-794.
Groenewold, Physica A, 2001, volumer 298, pp. 32-45.
Liau et al., Applied Physics Letters 1994, 64, 1484-1486.
Biebuyck et al., Langmuir 1994, 10, 2790-2793.
Wu et al., Langmuir 2002, 18, 9312-9318.
Bonaccurso et al., Applied Physics Letters 2005, 86, 124101-1-124101-2.
Suleski et al., Applied Optics 1995, 34, 7507-7517.
Peng et al., Optics Letters 2002, 27, 1720-1722.
Yang et al., Advanced Materials 2005, 17, 435-438.
Yang et al., Applied Physics Letters 2005, 86, 161110.
Yabu et al., Langmuir 2005, 21, 1709-1711.
Kunnavakkam et al., Applied Physics Letters 2003, 82, 1152-1154.
Allen, Analysis and Design of Structural Sandwich Panels, Pergamon Press, Oxfod 1969, 22 pages.
Pyun et al., Macromolecular Rapid Communications 2003, vol. 24, pp. 1043-1059.
Riise et al., Rheology and Shear-Induced Alignment of Lamellar Diblock and Triblock Copolymers, Macromolecules 1996, 28, 7653-7659, Abstract 1 page.
Thomas et al., Controlling Adhesion with Surface Hole Patterns, The Journal of Adhesion, 2006, pp. 311-329.
Autumn et al., Evidence for van der Waals adhesion in gecko setae, Proceedings of the National Academy of Sciences, 2002, vol. 99, No. 19, pp. 12252-12256, Abstract 2 pages.
Gorb, Attachment devices of insect cuticle, 2001, Dordrecht: Kluwer Academic Publishers, Abstract 1 page.
Gorb et al., Biological micro and nanotribology: Nature's solutions, 2001, Berlin: Springer-Verlag, Book review 1 page.
Glassmaker et al., Design of Biomimetric fibrillar interfaces: 1. Making contact, Journal of the Royal Society Interface, 2004, vol. 1, No. 1, pp. 23-33.
Hui et al., Design of biomimetric fibrillar interfaces: 2. Mechanics of enhanced adhesion, Journal of the Royal Society Interface, 2004, vol. 1, No. 1, pp. 35-48.
Kim et al., Biologically inspired polymer microfiber with spatulate tips as repeatable fibrillar adhesives, Applied Physics Letters, 2006, vol. 89, 261911, Abstract 1 page.
Aksak et al., Adhesion of biologically inspired vertical and angled polymer microfiber arrays, Langmuir, 2007, vol. 23, No. 6, pp. 3322-3332, Abstract 1 page.
Greiner et al., Adhesion of bioinspired micropatterned surfaces: Effects of pillar rad., aspect ratio and preload, Langmuir, 2007, vol. 23, No. 7, pp. 3995-3502, Abstract 1pg.
Lamblet et al., Adhesion enhancement through micropatterning at polydimethylsiloxane-acrylic adhesive interaces, Langmuir, 2007, vol. 23, No. 13, pp. 6966-6974, Abstract 2 pgs.
Jiang et al., Advanced Materials, 2006, vol. 18, pp. 1471-1475, Abstract 2 pages.
Chan et al., Advanced Materials, 2008, vol. 20, pp. 711-716.
Thesis of Edwin P. Chan, University of Massachusetts, Sep. 2007, 199 pages.
Schmidt et al., Formable compound micro-lens arrays, http://newsroom.spie.org/x4676.xml?ss=print, Nov. 8, 2006, 3 pages.
Holmes et al., http://meetings.aps.org/Meeting/MAR09/Event/95701, Mar. 16-20, 2009, Abstract, 1 page.
Chan et al., Fabricating microlens arrays by surface wrinkling, Advanced Materials, 2006, vol. 18, pp. 3238-3242.
U.S. Appl. No. 11/944,895 Non-Final Office Action dated: May 17, 2010, 17 pages.
U.S. Appl. No. 11/944,895 Restriction Requirement dated: Feb. 25, 2010, 11 pages.

* cited by examiner

Step 1. Preparation of an adhesive rigid substrate that provides the lateral confinement Step 2. External stimuli to develop compressive stress ← compression Step 3. A wrinkled adhesive develops due to lateral confinement and compression

WRINKLED ADHESIVE SURFACES AND METHODS FOR THE PREPARATION THEREOF

CROSS-REFERENCE TO RELATED APPLICATIONS

This application claims priority to provisional application 61/056,585 filed on May 28, 2008, the entire contents of which are hereby incorporated by reference.

STATEMENT REGARDING FEDERALLY SPONSORED RESEARCH & DEVELOPMENT

The U.S. Government has certain rights in this invention pursuant to National Science Foundation CAREER Award Number DMR-0349078.

BACKGROUND OF THE INVENTION

Nature has demonstrated that surface patterns can enhance adhesion. For example, the attachment devices of geckos and some insects are decorated with fibrillar structures called setae that provide temporary attachment and controlled release. See, e.g., K. Autumn, W.-P. Chang, R. Fearing, T. Hsieh, T. Kenny, L. Liang, W. Zesch, and R. J. Full, "Adhesive force of a single gecko foot-hair", Nature, 2000, volume 405, number 6787, pages 681-685; K. Autumn, M. Sitti, Y. A. Liang, A. M. Peattie, W. R. Hansen, S. Sponberg, T. W. Kenny, R. Fearing, J. N. Israelachvili, and R. J. Full, "Evidence for van der Waals adhesion in gecko setae", Proceedings of the National Academy of Sciences, 2002, volume 99, number 19, pages 12252-12256; S. N. Gorb, "Attachment devices of insect cuticle", 2001, Dordrecht: Kluwer Academic Publishers, page 305; S. N. Gorb and M. Scherge, "Biological micro and nanotribology: Nature's solutions", 2001, Berlin: Springer-Verlag. Previous work has focused on the development of fibrillar array-type patterned adhesives, where the fibril diameter and aspect ratio is designed to tailor the adhesion of the material. See, e.g., A. K. Geim, S. V. Dubonos, I. V. Grigorieva, K. S. Novoselov, A. A. Zhukov, and S. Y. Shapoval, "Microfabricated adhesive mimicking gecko foot-hair", Nature Materials, 2003, volume 2, number 7, pages 461-463; N. J. Glassmaker, T. Himeno, C-Y Hui, and J. Kim, "Design of biomimetic fibrillar interfaces: 1. Making contact", Journal of the Royal Society Interface, 2004, volume 1, number 1, pages 23-33; C. Y. Hui, N. J. Glassmaker, T. Tang, and A. Jagota, "Design of biomimetic fibrillar interfaces: 2. Mechanics of enhanced adhesion", Journal of the Royal Society Interface, 2004, volume 1, number 1, pages 35-48; A. J. Crosby, M. Hageman, and A. Duncan, "Controlling polymer adhesion with 'pancakes'", Langmuir, 2005, volume 21, number 25, pages 11738-11743; S. Kim and M. Sitti, "Biologically inspired polymer microfiber with spatulate tips as repeatable fibrillar adhesives", Applied Physics Letters, 2006, volume 89, 261911; B. Aksak, M. P. Murphy, and M. Sitti, "Adhesion of biologically inspired vertical and angled polymer microfiber arrays", Langmuir, 2007, volume 23, number 6, pages 3322-3332; C. Greiner, A. del Campo, and E. Artz, "Adhesion of bioinspired micropatterned surfaces: Effects of pillar radius, aspect ratio and preload", Langmuir, 2007, volume 23, number 7, pages 3995-3502; M. Lamblet, E. Verneuil, T. Vilmin, A. Buguin, P. Silberzan, and L. Léger, "Adhesion enhancement through micropatteming at polydimethylsiloxane-acrylic adhesive interfaces", Langmuir, 2007, volume 23, number 13, pages 6966-6974; R. J. Full, R. S. Fearing, T. W. Kenny, and K. Autumn, "Adhesive microstructure and its fabrication based on the adhesive mechanism of the Gecko", International Patent Application Publication No. WO 01/49776 A2, published 12 Jul. 2001; and K. Autumn, "Adhesive microstructure and method of forming same", U.S. Patent Application Publication No. US 2003/0124312 A1, published 3 Jul. 2003. Existing approaches to develop these patterned adhesives are based primarily on top-down fabrication approaches. Specifically, lithography, imprinting, and soft lithography are the primary technologies used in the fabrication process. However, there are two limitations in current design of patterned adhesives. First, the design of fibrillar arrays as patterned polymer adhesives typically leads to non-repeatable adhesive performance over the course of multiple attachment/detachment cycles. See, e.g. A. K. Geim, S. V. Dubonos, I. V. Grigorieva, K. S. Novoselov, A. A. Zhukov, and S. Y. Shapoval, "Microfabricated adhesive mimicking gecko foot-hair", Nature Materials, 2003, volume 2, number 7, pages 461-463; N. J. Glassmaker, T. Himeno, C-Y Hui, and J. Kim, "Design of biomimetic fibrillar interfaces: 1. Making contact", Journal of the Royal Society Interface, 2004, volume 1, number 1, pages 23-33; C. Greiner, A. del Campo, and E. Artz, "Adhesion of bioinspired micropatterned surfaces: Effects of pillar radius, aspect ratio and preload", Langmuir, 2007, volume 23, number 7, pages 3995-3502; and M. Lamblet, E. Verneuil, T. Vilmin, A. Buguin, P. Silberzan, and L. Léger, "Adhesion enhancement through micropatteming at polydimethylsiloxane-acrylic adhesive interfaces", Langmuir, 2007, volume 23, number 13, pages 6966-6974. Second, the fabrication technologies listed above are inefficient and non-scalable fabrication approaches. These limitations restrict the commercial application of the respective materials.

BRIEF DESCRIPTION OF THE INVENTION

The above-described and other drawbacks are alleviated by a method of preparing a wrinkled adhesive surface, comprising: swelling a laterally confined elastomer layer with a polymerizable monomer composition, thereby forming a swollen elastomer layer comprising a wrinkled surface; and polymerizing the polymerizable monomer composition to stabilize the wrinkled surface.

Another embodiment is a method of preparing a replicated wrinkled adhesive surface, comprising: swelling a laterally confined elastomer layer with a polymerizable monomer composition, thereby forming a swollen elastomer layer comprising a wrinkled surface; polymerizing the polymerizable monomer composition to stabilize the wrinkled surface; forming a template that is a three-dimensional negative of the stabilized wrinkled surface; and using the template to mold a replicate wrinkled adhesive surface.

Another embodiment is a method of controlling the adhesive properties of a wrinkled surface, comprising: swelling a laterally confined elastomer layer with a polymerizable monomer composition, thereby forming a swollen elastomer layer comprising a wrinkled surface; polymerizing the polymerizable monomer composition to stabilize the wrinkled surface; and controlling an adhesive property of the wrinkled surface by varying at least one factor selected from the group consisting of thickness of the laterally confined elastomer layer, elastic constant (E*) of the laterally confined elastomer layer, adhesion energy ($G_c$) of the laterally confined elastomer layer.

These and other embodiments, including wrinkled surfaces prepared by the methods, are described in detail below.

DETAILED DESCRIPTION OF THE INVENTION

Figure 1:
FIG. 1 is a schematic representation of a specific process for generating a patterned adhesive based on surface wrinkling.
Figure 1:
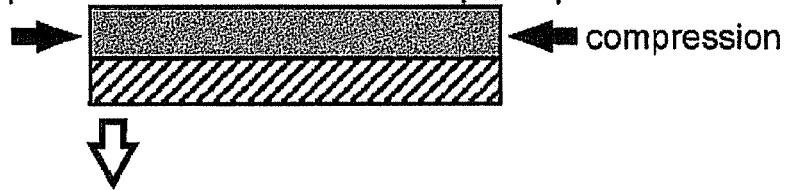
Figure 1:
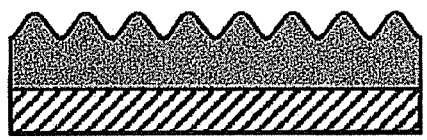

The method utilizes surface wrinkling to prepare a patterned adhesive elastomer layer. Surface wrinkling is an elastic instability that occurs on application of a critical compressive stress to a material. As a result of this instability, the surface of the material develops a surface topography with a well-defined buckling wavelength and amplitude. For a material that is laterally confined in at least one dimension, the compressive stress can be generated through a variety of stimuli that include mechanical compression, swelling, light activation (e.g., photopolymerization), and heat. An illustrative example of the use of mechanical compression to generate wrinkles can be found in C. Harrison, C. M. Stafford, W. H. Zhang, and A. Karim, *Applied Physics Letters*, 2004, volume 85, number 18, pages 4016-4018. An illustrative example of the use of swelling to generate wrinkles can be found in E. P. Chan and A. J. Crosby, *Soft Matter*, 2006, volume 2, pages 324-328. An illustrative example of the use of light activation to generate wrinkles can be found in H. Jiang, S. Kelch, and A. Lendlein, *Advanced Materials*, 2006, volume 18, pages 1471-1475. An illustrative example of the use of heat—specifically, the combination of heat and a mismatch in coefficients of thermal expansion—to generate wrinkles can be found in N. Bowden, S. Brittain, A. G. Evans, J. W. Hutchinson, and G. M. Whitesides, *Nature*, 1998, volume 393, number 6681, pages 146-149. If a repeating one-dimensional constraint is used and the dimension of constraint is commensurate with the buckling wavelength, then long range, ordered patterns can be produced. For an example of one-dimensional constraint using a different mechanism of constraint, see E. P. Chan and A. J. Crosby, *Soft Matter*, 2006, volume 2, pages 324-328. In some embodiments and as depicted in FIG. 1, the compressive stress is generated using a combination of lateral confinement, which is provided by a rigid substrate, and external stimuli to develop compressive stress. As the control of the shape instability is linked to the degree of lateral confinement, a variety of material systems can be employed.

The present method allows rapid generation of a patterned surface over macroscopic lateral dimensions. It also provides an efficient, low cost means to generate a patterned adhesive surface. Surface wrinkle dimensions can be controlled via selection of local elastic moduli and the degree of lateral manipulation. The method is applicable to a wide variety of surface materials and is suitable for fabrication of non-planar adhesive surfaces, such as adhesive particles. Adhesive surfaces generated by the method are useful in applications including pressure sensitive adhesives, friction-modified surfaces (e.g., in contact lenses), and as adhesive particles for cosmetics such as hair lotions and gels.

One embodiment is a method of preparing a wrinkled adhesive surface, comprising: swelling a laterally confined elastomer layer with a polymerizable monomer composition, thereby forming a swollen elastomer layer comprising a wrinkled surface; and polymerizing the polymerizable monomer composition to stabilize the wrinkled surface. It will be understood that, in this embodiment, "polymerizing the polymerizable monomer composition" means polymerizing the polymerizable monomer composition within the swollen elastomer layer.

The elastomer layer is laterally confined prior to and during swelling with the polymerizable monomer composition. As used herein, the term "laterally confined" means that the elastomer layer is prevented from expanding in at least one dimension perpendicular to the thickness (i.e., the smallest dimension) of the elastomer layer. A variety of mechanisms can be used for lateral confinement. In some embodiments, lateral confinement is created by physical adhesion of the elastomer layer to an underlying substrate. For example, when an elastomer layer is formed by polymerization of a liquid monomer composition on a substrate surface, the resulting elastomer layer is typically physically adhered to the underlying substrate. In some embodiments, lateral confinement is created by covalent bonding of the elastomeric layer to an underlying substrate. For example, a thiol-functionalized vinyl monomer can be covalently bonded to the surface of a gold substrate and subsequently copolymerized with another vinyl monomer to form a polyvinyl layer covalently bonded to the gold surface via gold sulfide linkages. In some embodiments, lateral confinement is created by modification of a surface of the elastomer layer to form a sublayer having a flexural modulus greater than that of the elastomer layer. For example, a polydimethylsiloxane layer can be formed on a substrate, the exposed surface can be oxidized to a silicate by exposure to ozone and ultraviolet light, and the substrate could then be separated to yield a polydimethylsiloxane layer with a rigid silicate sublayer. In some embodiments, lateral confinement is created by a rigid surface at the edge of and perpendicular to the elastomer layer. For example, photolithography can be used to create a rigid array of wells characterized by a lateral dimension on the order of about 5 nanometers to about 5 centimeters and a depth on the order of about 5 nanometers to about 500 micrometers; the an elastomer can cast within the wells using a technique such as dip casting, solution casting, or spin casting. Lateral confinement can also be created by combinations of the above methods. For example, in some embodiments, both adhesion of the elastomer layer to a substrate and covalent bonding of the elastomer layer to a substrate contribute to lateral confinement.

In some embodiments, the elastomer layer is laterally confined by adhesion of the elastomer layer to an underlying substrate, covalent bonding of the elastomer layer to an underlying substrate, or a combination thereof The laterally confined elastomer layer is capable of absorbing and being swollen by the polymerizable monomer composition. To be swollen by the polymerizable monomer composition, the laterally confined elastomer will generally be a material that can experience large deformations or strains and be able to recover its original configuration on release of the deformation. In some embodiments, the swelling can be characterized by a volume increase of at least 50%. In some embodiments, the ability of the material to be swollen is characterized by an elastic constant, $E^*$, of about $10^2$ to about $10^{10}$ newton/meter$^2$ as measured at 23° C.

In some embodiments, the stabilized wrinkled surface exhibits surface adhesion that is repeatable through multiple cycles of contact and separation from another surface. For example, the stabilized wrinkled surface can exhibit a separation force, $P_s$, that is at least 90 percent repeatable over ten cycles of contact and separation of the stabilized wrinkled surface and a glass surface. Specifically, each separation force value for ten cycles of contact and separation can vary within a range of 90-110%, specifically 95-105%, of the mean separation force value for all ten cycles.

In other embodiments, the stabilized wrinkled surface exhibits non-repeatable adhesion. In these embodiments, the stabilized wrinkled surface may not exhibit repeatable surface adhesion because the surface morphology has changed, for example, the uniform amplitudes of the original wrinkles have changed to non-uniform values, or because certain wrinkles have disintegrated such that the effective wavelength has increased significantly.

A wide variety of materials are capable of providing the desired swellability. For example, the laterally confined elastomer layer can comprise one or more polymers including polysiloxanes, poly(alkyl (meth)acrylate)s, poly(conjugated diene)s, block copolymers of alkenyl aromatic monomers and conjugated dienes, polyacrylamides, polyethylene glycols, and the like, and mixtures and block or graft copolymers thereof As used herein, the prefix "(meth)acryl-" includes acryl- and methacryl-. In some embodiments, the laterally confined elastomer layer comprises poly(n-butyl acrylate).

In some embodiments, the laterally confined elastomer layer is the product of polymerizing a composition comprising n-butyl acrylate and a first crosslinker comprising at least two polymerizable groups selected from the group consisting of (meth)acryloyl groups, vinyl groups, allyl groups, and combinations thereof In some embodiments, the first crosslinker is a polyfunctional (meth)acrylate. In some embodiments, the polyfunctional (meth)acrylate is ethylene glycol dimethacrylate. For example, the laterally confined elastomer layer can be the polymerization products of n-butyl acrylate and ethylene glycol dimethacrylate in a weight ratio of about 70:30 to about 99.8:0.2, specifically about 80:20 to about 99.5:0.5, more specifically about 90:10 to about 99:1, even more specifically about 95:5 to about 99:1.

The laterally confined elastomer layer is swollen with a polymerizable monomer composition. The amount of the polymerizable monomer composition is chosen to cause a degree of swelling that results in wrinkling of the elastomer layer surface. For example, the weight of the polymerizable monomer composition can be about 0.2 to 2 times the weight of the elastomer layer, specifically about 0.5 to 1.5 times the weight of the elastomer layer.

The formation of a wrinkled surface is a product of the osmotic stress created by elastomer layer swelling and the lateral confinement of the elastomer layer. Specifically, the osmotic stress coupled with lateral confinement leads to the development of a net compressive force that causes the wrinkling as a means of relieving the compressive force.

The polymerizable monomer composition can be the same as or different from the monomer composition used to form the laterally confined elastomer layer. The polymerizable monomer composition typically comprises about 50 to 100 percent by weight polymerizable monomer, with the balance being solvent, polymerization catalyst, or other additive.

Useful polymerizable monomers include alkenyl aromatic monomers (such as styrene and alkylstyrenes), acrylate monomers (such as alkyl(meth)acrylates), alkenyl ether monomers (such as diethylene glycol divinyl ether), and combinations thereof In some embodiments, the polymerizable monomer composition further comprises a second crosslinker comprising at least two polymerizable groups selected from the group consisting of acryloyl groups, vinyl groups, allyl groups, and combinations thereof In some embodiments, the second crosslinker is a polyfunctional (meth)acrylate. In some embodiments, the polyfunctional (meth)acrylate is ethylene glycol dimethacrylate. As an illustrative example, the polymerizable monomer composition can consist of 1 weight percent photopolymerization catalyst and 99 weight percent of a monomer mixture consisting of n-butyl acrylate and ethylene glycol dimethacrylate in a weight ratio of about 70:30 to about 99.8:0.2, specifically about 80:20 to about 99.5:0.5, more specifically about 90:10 to about 99:1, even more specifically about 95:5 to about 99:1.

After the laterally confined elastomer layer is swollen with the polymerizable monomer composition and a wrinkled surface is spontaneously formed on the laterally confined elastomer layer, the imbibed polymerizable monomer composition is polymerized to stabilize the wrinkles. Useful polymerization techniques include, for example, heating the polymerizable monomer, exposing the polymerizable monomer to ultraviolet light, exposing the polymerizable monomer to gamma radiation, exposing the polymerizable monomer to an electron beam, exposing the polymerizable monomer to x-rays, and combinations thereof In some embodiments, the polymerizable monomer composition is photopolymerized. Polymerization of the polymerizable monomer composition forms a polymer network that interpenetrates the polymer composition of the initial laterally confined elastomer layer.

The stabilized surface comprises wrinkles. These wrinkles can be characterized by a buckling wavelength, which corresponds to the average peak-to-peak separation of wrinkles. Techniques for determining the bucking wavelength are described below in the working examples. In some embodiments, the stabilized wrinkled surface has a buckling wavelength of about 50 nanometers to about 1,000 micrometers, specifically 100 nanometers to 600 micrometers, more specifically 1 to 500 micrometers, even more specifically 10 to 500 micrometers, still more specifically 100 to 500 micrometers, yet more specifically 250 to 500 micrometers. The surface wrinkles can also be characterized by the standard deviation of the buckling wavelength, the average fill width at half maximum height of the wrinkles, the diffraction or Fourier transform of the diffraction spots produced by interaction of the wrinkles with electromagnetic energy, the standard deviation of the wrinkle amplitude, and the like.

It is important to note that buckling wavelength can be selected by manipulation of elastomer adhesion energy, elastomer elastic constant, and elastomer layer thickness. Thus, one embodiment is a method of controlling the adhesive properties of a wrinkled surface, comprising: swelling a laterally confined elastomer layer with a polymerizable monomer composition, thereby forming a swollen elastomer layer comprising a wrinkled surface; polymerizing the polymerizable monomer composition to stabilize the wrinkled surface; and controlling an adhesive property of the wrinkled surface by varying at least one factor selected from the group consisting of thickness of the laterally confined elastomer layer, elastic constant (E*) of the laterally confined elastomer layer, adhesion energy ($G_c$) of the laterally confined elastomer layer. For an explanation of the mathematical relationships between materials properties and layer thicknesses and buckling wavelengths, see, E. P. Chan, E. J. Smith, R. C. Hayward, and A. J. Crosby, *Advanced Materials,* 2008, volume 20, pages 711-716.

A surprising and very useful property of the wrinkled adhesive surfaces is that they exhibit enhanced adhesion relative to smooth surfaces having the same composition. This is demonstrated in the working examples below, where adhesion of wrinkled elastomer surfaces to a smooth glass surface is found to be enhanced relative to adhesion of a smooth elastomer surface to a smooth glass surface. An objective measure of this enhancement is the normalized separation strength, $\sigma_{s,n}$, which normalizes the maximum separation force for both the area of contact and the corresponding maximum separation force of a smooth elastomer surface of the same material. A detailed explanation of how to calculate normalized separation strength is provided in the working examples below. In some embodiments, the stabilized wrinkled surface exhibits a normalized separation strength, $\sigma_{s,n}$, greater than 1, wherein the normalized separation strength is measured using adhesion to a glass surface and normalized relative to adhesion of a smooth surface having the same composition as the stabilized wrinkled surface. In some embodiments, the normalized separation strength is greater than 1 to about 15, specifically 1.1 to 12, more specifically 1.5 to 10, still more specifically 2 to 8, even more specifically 3 to 7, yet more specifically 4 to 5. For elastomer surfaces exhibiting repeatable adhesion over at least 10 cycles, normalized separation strengths of 1.5 to at least 4 have been observed. For viscoelastic surfaces exhibiting non-repeatable adhesion, normalized separation strengths of at least 7 have been observed.

In a very specific embodiment, the laterally confined elastomer layer is laterally confined by adhesion of the elastomer layer to an underlying substrate, covalent bonding of the elastomer layer to an underlying substrate, or a combination thereof; the laterally confined elastomer layer is the product of photopolymerizing a composition comprising n-butyl acrylate and ethylene glycol dimethacrylate; the polymerizable monomer composition comprises n-butyl acrylate and ethylene glycol dimethacrylate in a weight ratio of about 90:10 to about 99.5:0.5; the polymerizing the polymerizable monomer composition comprises photopolymerizing the polymerizable monomer composition; the stabilized wrinkled surface has a buckling wavelength of about 250 to about 500 micrometers; the stabilized wrinkled surface exhibits a normalized separation strength, $\sigma_{s,n}$, of about 1.5 to about 4, wherein the normalized separation strength is measured using adhesion to a glass surface and normalized relative to adhesion of a smooth surface having the same composition as the stabilized wrinkled surface; and the stabilized wrinkled surface exhibits a separation force, $P_s$, that is at least 95 percent repeatable over ten cycles of contact and separation of the stabilized wrinkled surface and a glass surface.

Other embodiments include wrinkled adhesive surfaces prepared according to any of the above-described methods.

Another embodiment is a method of preparing a replicated wrinkled adhesive surface, comprising: swelling a laterally confined elastomer layer with a polymerizable monomer composition, thereby forming a swollen elastomer layer comprising a wrinkled surface; polymerizing the polymerizable monomer composition to stabilize the wrinkled surface; forming a template that is a three-dimensional negative of the stabilized wrinkled surface; and using the template to mold a replicate wrinkled adhesive surface. While not wishing to be bound by any particular theory, the present inventors believe that one difference between an adhesive surface formed directly by wrinkling and one formed by replication of the original wrinkled surface is that portions of the original wrinkled surface may be in compression or tension, whereas the replicated surface does not include such portions. Another possible difference between the original wrinkled surface and the replicated surface is that the thickness of the laterally constrained elastomer layer used to form the original wrinkled surface is related to the buckling wavelength, whereas the thickness of the replicated surface is independent of the buckling wavelength and determined primarily by the replication molding conditions.

The swelling and polymerization steps of the replicate forming method are the same as those described above in the context of formation of an original wrinkled surface. Once the original wrinkled surface is formed, it is used to create a template that is a three-dimensional negative of the wrinkled adhesive surface. The template is typically formed from a material that has a fracture energy greater than the adhesion energy between the template and the wrinkled adhesive surface. The template material also typically is elastic, so that following separation of the template from the wrinkled adhesive surface the template contains the precisely complementary wrinkled morphology.

The template can be formed by depositing a third polymerizable monomer composition on the stabilized wrinkled surface, polymerizing the third polymerizable monomer composition, and separating the polymerized third polymerizable monomer composition from the stabilized wrinkled surface. The third polymerizable monomer composition can be, for example, a mercapto-ester monomers. Such monomers are commercially available and include, for example, NOA 60 available from Norland Products. Polymerization of the third polymerizable monomer composition can utilize any of the polymerization techniques described above in the context of wrinkle stabilization. In some embodiments, the third polymerizable monomer composition is photopolymerized, as with the mercapto-ester material mentioned above. In other embodiments, no polymerization is required, and the template can be formed by casting a low-melting point material like solder or wax, or the template can be formed by vapor deposition of metal onto the stabilized wrinkled surface.

Once a template is formed, it can be used to mold a replicate wrinkled surface having the same geometry as the original wrinkled surface. For example, the replicated wrinkled surface can be created by depositing a fourth polymerizable monomer composition on the template, polymerizing the fourth polymerizable monomer composition, and separating the polymerized fourth polymerizable monomer composition from the template. The fourth polymerizable monomer composition can be the same as or different from the first polymerizable monomer composition (used to form the laterally confined elastomer layer). The fourth polymerizable monomer composition can be the same as or different from the second polymerizable monomer composition (used to swell the laterally confined elastomer layer and stabilize the spontaneously formed wrinkles). In some embodiments, the fourth polymerizable monomer composition comprises a monomer selected from the group consisting of alkenyl aromatic monomers, acrylate monomers, alkenyl ether monomers, and combinations thereof In some embodiments, the fourth polymerizable monomer composition comprises n-butyl acrylate and ethylene glycol dimethacrylate in a weight ratio of about 90:10 to about 99.5:0.5.

Other embodiments include replicated wrinkled adhesive surfaces prepared according to the above-described method.

The invention is further illustrated by the following non-limiting examples.

EXAMPLE 1

Figure 2:
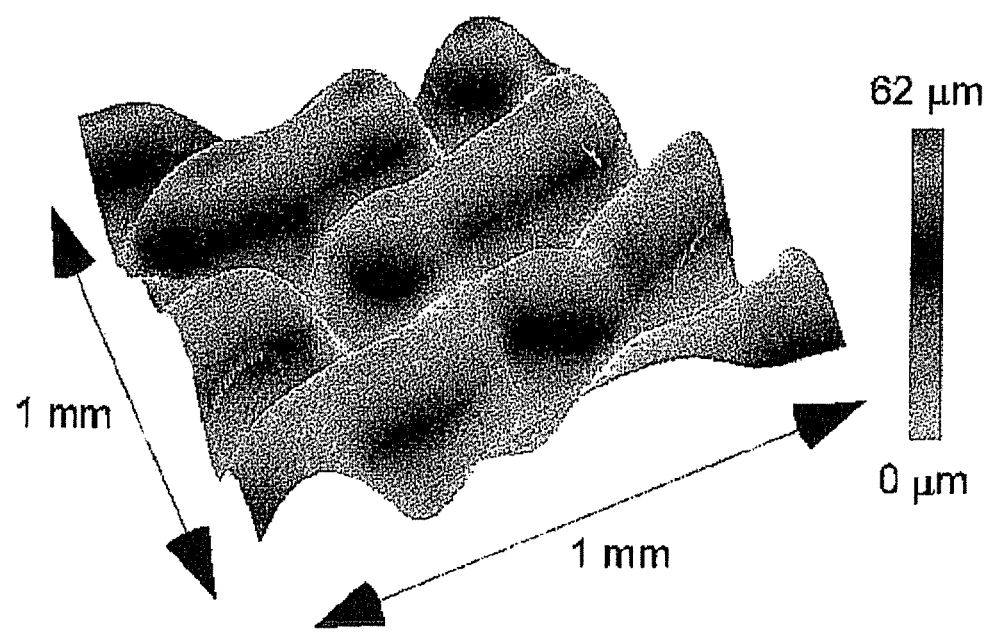
FIG. 2 is a 3D surface profile of a 1 millimeter$^2$ portion of a wrinkled surface.

Surface wrinkles of poly(n-butyl acrylate) (PnBA) were fabricated based on the swelling of a laterally confined elastomer layer. The process began by preparing a PnBA elastomeric film on a glass substrate. The elastomeric film was fabricated using a photocurable acrylate formulation consisting of n-butyl acrylate (98 weight percent), ethylene glycol dimethacrylate (2 weight percent), and photoinitiators obtained as Irgacure 184 and Irgacure 719 from Ciba Specialty Chemicals, Tarrytown, N.Y.). Each photoinitiator was used at a concentration of 1 weight percent based on the total weight of n-butyl acrylate and ethylene glycol dimethacrylate. The monomer and crosslinker were purified before use by filtering through alumina to remove inhibitors and then combined with the photoinitiators to yield the polymerizable composition. To prepare PnBA films of controlled thicknesses, a defined volume (typically, 0.1 to 0.2 milliliter) of the acrylate formulation was dispensed onto a glass substrate (a 1 inch by 1 inch glass coverslip) and irradiated with ultraviolet light (OAI 500 W DUV, San Jose, Calif., $\lambda$=365 nm, intensity=17 MW/cm$^2$) for 3 minutes, which photopolymerized and cured the composition. To wrinkle the resulting PnBA film, about 0.1 mL of the same polymerizable composition was deposited onto the elastomers film surface. This volume was chosen because it was sufficient to cover the entire film surface. The PnBA film was allowed to swell for about 2.5 minutes, after which the excess nBA solution was removed by absorption with a lab tissue. Swelling was accompanied by surface wrinkle formation. The film was allowed to continue swelling for an additional 30 seconds to fully develop the wrinkles. The wrinkles were then stabilized by photopolymerizing the acrylate swelling agent under ultraviolet light for three minutes. The resulting wrinkled PnBA film can be used directly as a viscoelastic wrinkled adhesive. To achieve full curing of the film, it can be further irradiated for about 1 minute with a high-intensity ultraviolet source (UV Process Supply, Chicago, Ill., intensity≈140 MW/cm$^2$). The 3D surface profile of the PnBA wrinkled surface was characterized by a Zygo NewView 6000 3D optical profiler (Zygo Corporation, Middlefield, Conn.), using a 50× Mirau objective. A representative 3D surface profile for a wrinkled PnBA film is presented in FIG. 2. Prior to profiling, a thin layer of gold/platinum alloy was evaporated onto the surface.

Film thickness prior to swelling and buckling wavelength after swelling were determined using bright-field optical microscopy. Specifically, PnBA film thickness is measured by imaging its cross-section. A direct method to measure buckling wavelength involves imaging the surface top-down with bright-field optical microscopy. Since it is necessary to obtain some statistics of the buckling wavelength, a convenient approach is to use imaging software and take the Fast Fourier Transform (FFT) of the image. Alternatively, one can measure the buckling wavelength over multiple wrinkles and obtain a statistical average. Yet another method involves measuring the buckling wavelength by laser light diffraction, which is essentially another way of generating the reciprocal-space FFT image. In these experiments, buckling wavelength was measured by taking a bright-field image and then taking a statistical average by measuring multiple wrinkles. To ensure an accurate measurement of buckling wavelength, analysis is conducted on micrographs taken from the contact adhesion test at the point at which the probe is initially in contact with the wrinkled adhesive.

EXAMPLE 2

This example demonstrates the fabrication of a replicated wrinkled surface using micromolding. Using the Example 1 elastic wrinkled PnBA films as master templates, daughter templates (which correspond to "templates" as that term is used in the claims) were constructed by depositing the mercaptoester-based Norland Optical Adhesive 60 (NOA 60, Edmunds Optics, Barrington, N.J.) optical liquid adhesive onto the master templates. The assembly was then irradiated by high-intensity ultraviolet light (ca. 140 MW/cm$^2$) for 1 minute, which photocured the NOA 60 to form an optically transparent, rigid template. This daughter template was separated from the PnBA master and used to mold replicated PnBA by depositing the Example 1 nBA polymerizable composition onto the daughter template surface and photopolymerizing with ultraviolet light (intensity ca. 140 MW/cm$^2$) for about one minute.

EXAMPLE 3

This example describes contact adhesion testing of wrinkled films. A custom-built test apparatus was used. A wrinkled polymer surface adhered via its back face to a glass substrate was mounted onto a translation stage of an inverted microscope. The test was carried out at a fixed displacement rate of about 3 micrometers/second and began by bringing the flat end face of a cylindrical glass probe (Edmunds Optics, Barrington, N.J.) into contact with the wrinkled polymer surface. On forming a defined interfacial contact, the probe was separated to break the interface. During the entire test, the force (P), displacement ($\delta$), and contact area ($A=\pi a_p^2$, where $a_p$ is the radius of the glass probe) were recorded using custom-developed National Instruments LabVIEW software. The force was monitored by a force transducer (1 kilogram load cell, Honeywell Sensotec, Columbus, Ohio) connected in series with a nanoposition manipulator (Burleigh Instruments Inchworm Model IW-820) that controlled the displacement. The interfacial contact areas were captured using a CCD camera (Pixelfly) mounted in-line with the inverted optical microscope (bright field, objective=2.5×, Zeiss Axiovert, Thornwood, N.Y.). For each wrinkled adhesive, at least three contact adhesion tests (corresponding to separately prepared adhesive surfaces) were performed to verify the consistency of the adhesive properties of each material.

Figure 3:
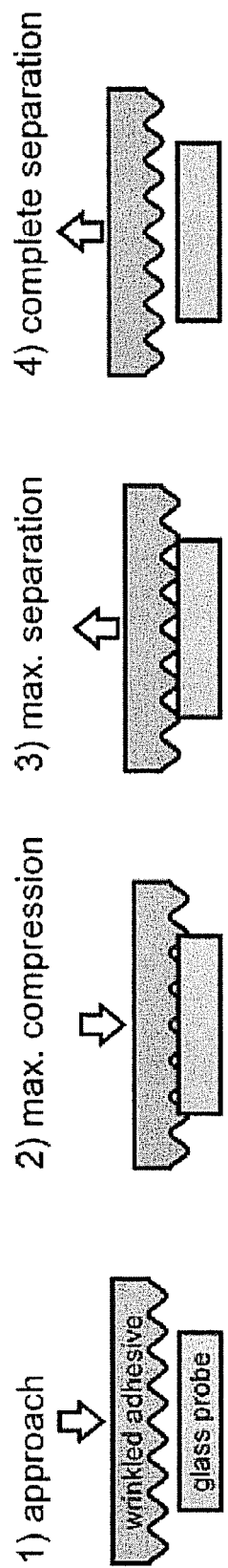
FIG. 3 is a schematic representation of a contact adhesion testing process, where step 1 is approach of a glass probe to a wrinkled surface, step 2 is maximum compression of the glass probe against the wrinkled surface, step 3 is the maximum separation at which the glass probe and the wrinkled surface are still in contact, and step 4 is complete separation of the glass probe and the wrinkled surface.

The contact adhesion testing process is depicted in FIG. 3, where step 1 is approach of the glass probe to the wrinkled surface, step 2 is maximum compression of the glass probe against the wrinkled surface, step 3 is the maximum separation at which the glass probe and the wrinkled surface are still in contact, and step 4 is complete separation of the glass probe and the wrinkled surface.

Figure 4:
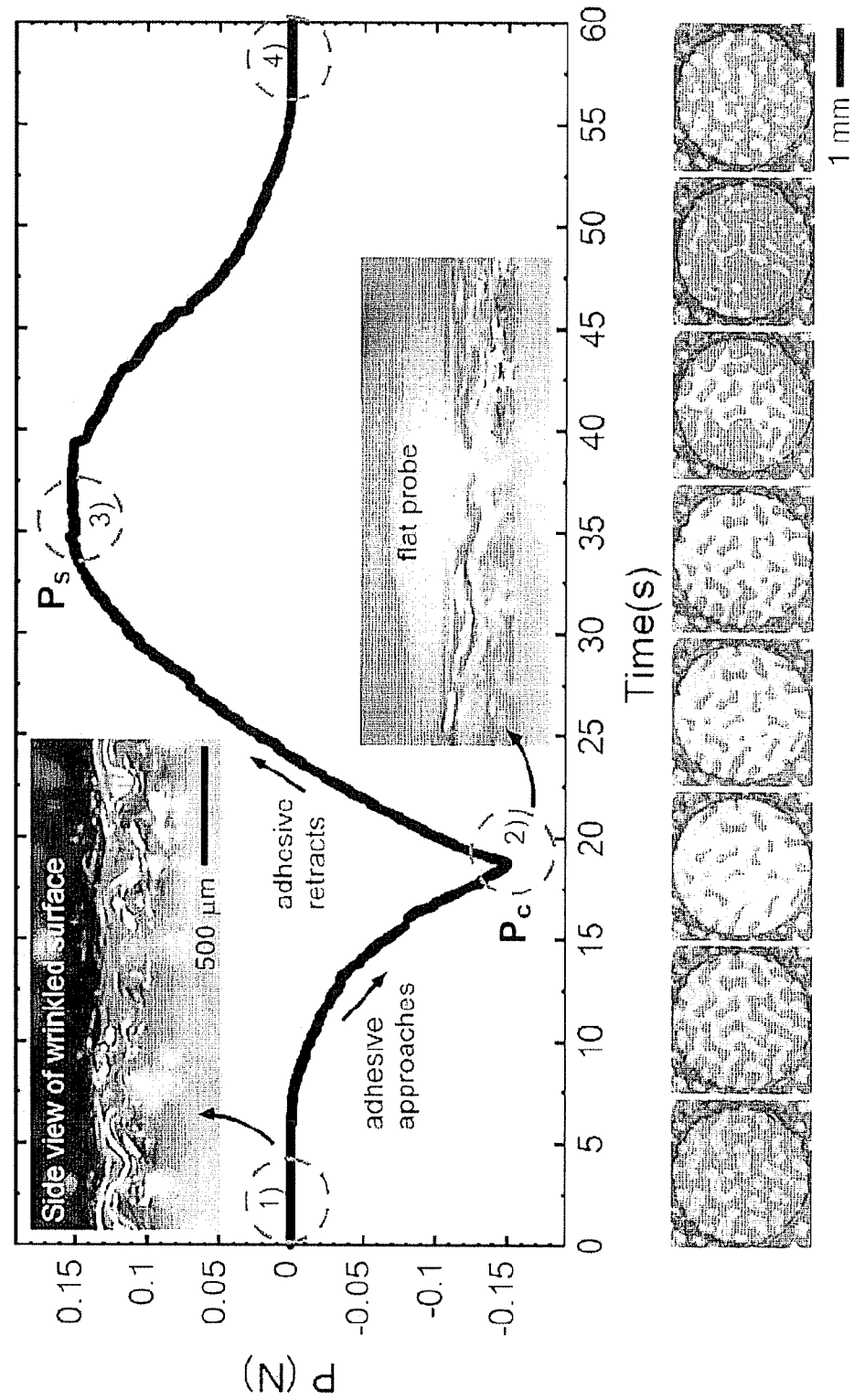
FIG. 4 presents results of contact adhesion testing of a wrinkled PnBA film. The main feature of FIG. 4 is a plot of force (P), expressed in newtons (N), versus time, expressed in seconds (s). Points corresponding to steps 1-4 in FIG. 3 are labeled. The upper left inset within the plot is a side-view image of the wrinkled surface on approach of the probe (but before contact). The lower right inset within the plot is a side view of the surface during maximum compression. Below the plot are top-view images of the wrinkled surface at various points in the approach and separation process.

Results of contact adhesion testing of a wrinkled PnBA film are presented in FIG. 4. The main feature of FIG. 4 is a plot of force (P), expressed in newtons (N), versus time, expressed in seconds (s). Points corresponding to steps 1-4 in FIG. 3 are labeled. The upper left inset within the plot is a side-view image of the wrinkled surface on approach of the probe (but before contact). The side view shown and other side view images indicate that adhesive wrinkles do not form additional interfaces by folding on each other. The lower right inset within the plot is a side view of the surface during maximum compression. Below the plot are top-view images of the wrinkled surface at various points in the approach and separation process.

Figure 5:
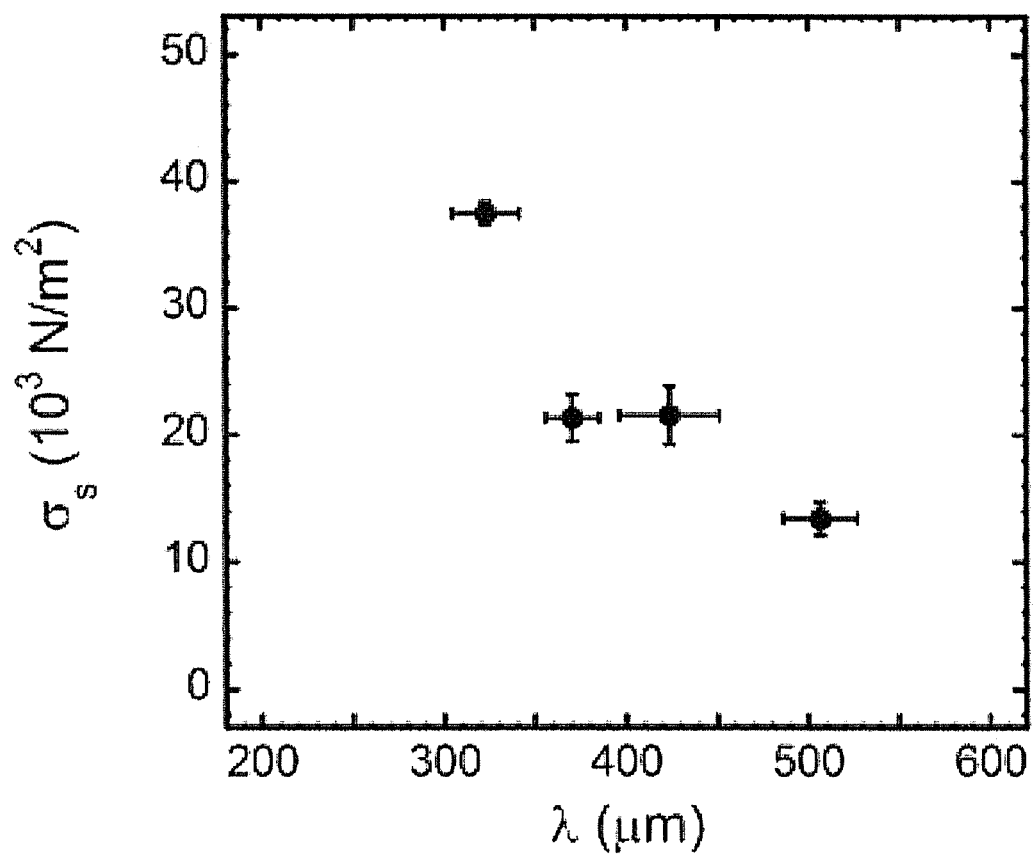
FIG. 5 is a plot of separation strength, $\sigma_s$, expressed in units of $10^3$ newtons/meter$^2$ (N/m$^2$), versus buckling wavelength $\lambda$, expressed in units of micrometers (μm), for four different wrinkled surfaces.

FIG. 5 is a plot of separation strength, $\sigma_s$, expressed in units of $10^3$ newtons/meter$^2$ (N/m$^2$), versus buckling wavelength $\lambda$, expressed in units of micrometers (µm), for four different wrinkled surfaces. Separation strength is a surface area-normalized measure of adhesive strength. Separation strength is calculated as $P_s/A$, where $P_s$ is the measured separation strength, and A is the area of the glass probe. The FIG. 5 plot shows stronger adhesion at smaller buckling wavelengths and demonstrates that adhesive properties can be controlled via manipulation of surface buckling wavelength. Comparing the $\sigma_s$ values between the wrinkled adhesive with the smallest buckling wavelength ($\lambda \approx 325$ µm) to that of the wrinkled adhesive with the largest buckling wavelength ($\lambda \approx 505$ µm) indicates a three-fold increase in adhesion strength simply by changing the buckling wavelength.

Figure 6:
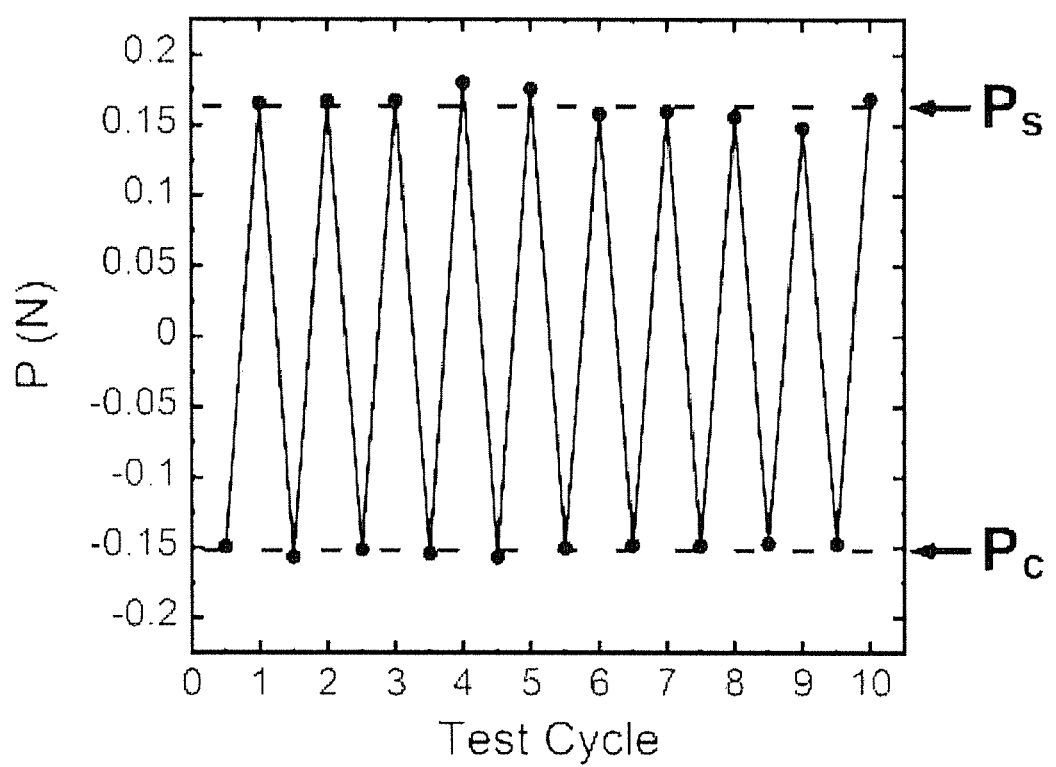
FIG. 6 is a plot of maximum compression force, $P_c$, and maximum separation force, $P_s$, over 10 test cycles of contact and separation of a wrinkled adhesive layer and a glass probe.

FIG. 6 is a plot of maximum compression force, $P_c$, and maximum separation force, $P_s$, over 10 test cycles. These data show that the adhesive properties of the surface are highly repeatable over at least ten cycles.

Figure 7:
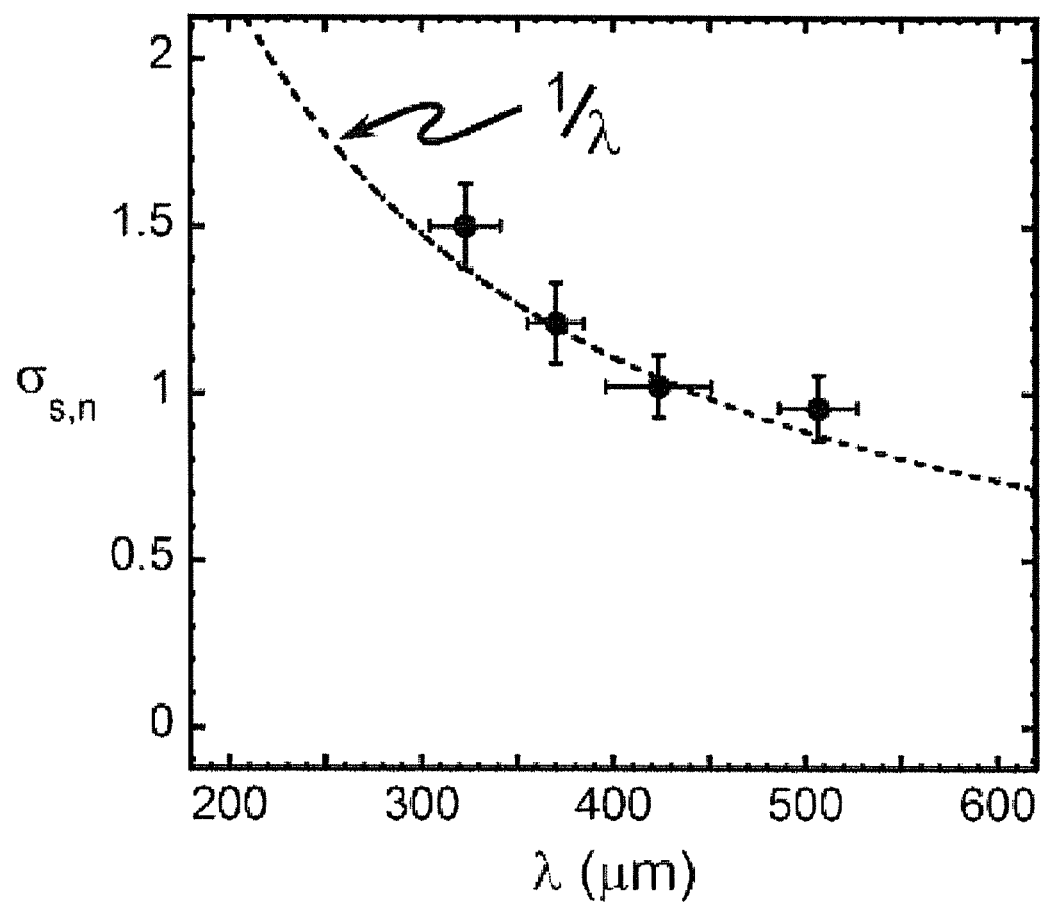
FIG. 7 is a plot of normalized separation strength, $\sigma_{s,n}$, which is unitless, versus buckling wavelength for a replicated wrinkled surface.

FIG. 7 is a plot of normalized separation strength, $\sigma_{s,n}$, which is unitless, versus buckling wavelength for a replicated wrinkled surface prepared as described in Example 2. The normalized separation strength is calculated as the ratio of $\sigma_s$ for the tested wrinkled surface to $\sigma_s$ for a smooth surface of the same composition. The results in FIG. 7 demonstrate a 50% increase in adhesion for the smallest buckling wavelength ($\lambda \approx 325$ µm) wrinkled surface versus a smooth surface. The results also show that a surface having a buckling wavelength of about 500 micrometers showed adhesion equivalent to that of a smooth surface. Finally, the results suggest that the enhancement of separation strength is inversely proportional to buckling wavelength.

Figure 8:
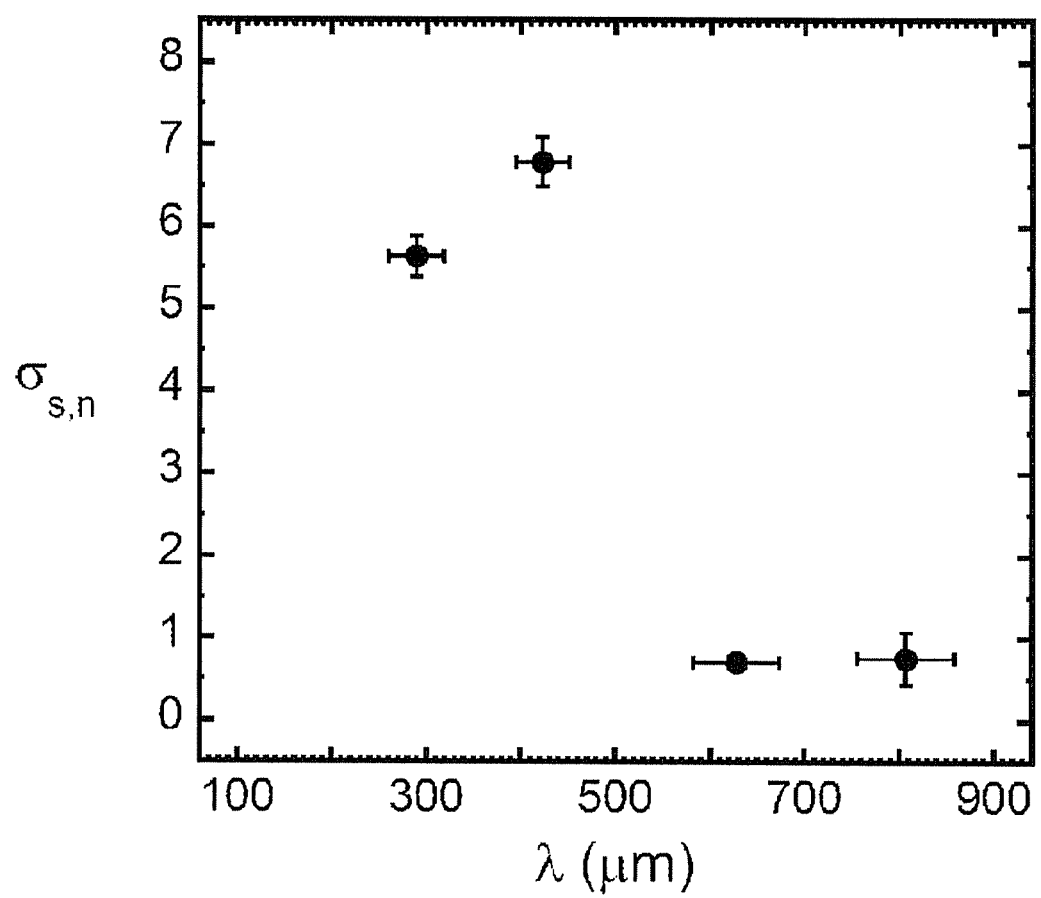
FIG. 8 is a plot of normalized separation strength, $\sigma_{s,n}$, versus buckling wavelength, $\lambda$, for a viscoelastic wrinkled surface.

FIG. 8 is a plot of normalized separation strength, $\sigma_{s,n}$, versus buckling wavelength, $\lambda$, for a viscoelastic wrinkled surface. The surface was prepared using the procedure in Example 1, except that a shorter ultraviolet irradiation time was used to intentionally undercure the composition. The results again show an inverse scaling with buckling wavelength. The nearly seven-fold enhancement is much greater than the approximately four-fold observed for fully cured PnBA. However, the adhesion in the viscoelastic wrinkled surface is non-reversible, so its utility is primarily in single-use applications.

Additional experimental details can be found in E. P. Chan, E. J. Smith, R. C. Hayward, and A. J. Crosby, *Advanced materials*, 2008, volume 20, pages 711-716; and in the Ph.D. thesis of Edwin P. Chan, University of Massachusetts, September 2007.

In summary, the method provides an elegant and scalable approach to repeatable, "smart" adhesive surfaces. Enhancement of adhesion relative to adhesion of a smooth surface is increased by increasing the contact line per unit area, which in turn is a function of the geometry and materials properties of the interface. Smaller buckling wavelengths produce greater adhesion enhancements, so adhesion can be tailored by designing wrinkle patterns of specific buckling wavelengths. Repeatable adhesion enhancements relative to smooth surfaces have been observed. Greater enhancements are expected with smaller buckling wavelength systems, which can be created by increasing the strength of lateral constraint (e.g., by covalently bonding a PnBA film to a glass substrate), and/or by use of stiffer elastomer layers, and/or by use of thinner elastomer layers. Additional enhancement of adhesion strength is provided by viscoelastic materials, but adhesion was observed to be non-reversible with such materials.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of preparing a wrinkled adhesive surface, comprising:
    swelling a laterally confined elastomer layer with a polymerizable monomer composition, thereby forming a swollen elastomer layer comprising a wrinkled surface; and
    polymerizing the polymerizable monomer composition to stabilize the wrinkled surface; wherein the stabilized wrinkled surface exhibits a normalized separation strength, $\sigma_{s,n}$, greater than 1, wherein the normalized separation strength is measured using adhesion to a glass surface and normalized relative to adhesion of a smooth surface having the same composition as the stabilized wrinkled surface.

2. The method of claim 1, wherein the laterally confined elastomer layer is laterally confined by a mechanism selected from the group consisting of adhesion of the elastomer layer to an underlying substrate, covalent bonding of the elastomer layer to an underlying substrate, modifying a surface of the elastomer layer to form a sublayer having a flexural modulus greater than that of the elastomer layer; bounding of the elastomer layer by a rigid surface at the edge of and perpendicular to the elastomer layer, and combinations thereof.

3. The method of claim 1, wherein the laterally confined elastomer layer is laterally confined by adhesion of the elastomer layer to an underlying substrate, covalent bonding of the elastomer layer to an underlying substrate, or a combination thereof.

4. The method of claim 1, wherein the laterally confined elastomer layer comprises a polymer having an elastic constant, $E^*$, of about $10^2$ to about $10^{10}$ newton/meter$^2$.

5. The method of claim 1, wherein the laterally confined elastomer layer comprises a polymer selected from the group consisting of polysiloxanes, poly(alkyl (meth)acrylate)s, poly(conjugated diene)s, block copolymers of alkenyl aromatic monomers and conjugated dienes, polyacrylamides, polyethylene glycols, and combinations thereof.

6. The method of claim 1, wherein the laterally confined elastomer layer comprises poly(n-butyl acrylate).

7. The method of claim 1, wherein the laterally confined elastomer layer is the product of polymerizing a composition comprising n-butyl acrylate and a first crosslinker comprising at least two polymerizable groups selected from the group consisting of (meth)acryloyl groups, vinyl groups, allyl groups, and combinations thereof.

8. The method of claim 7, wherein the first crosslinker is a polyfunctional (meth)acrylate.

9. The method of claim 8, wherein the polyfunctional (meth)acrylate is ethylene glycol dimethacrylate.

10. The method of claim 1, wherein the polymerizable monomer composition comprises a polymerizable monomer selected from the group consisting of alkenyl aromatic monomers, acrylate monomers, alkenyl ether monomers, and combinations thereof.

11. The method of claim 10, wherein the polymerizable monomer composition further comprises a second crosslinker comprising at least two polymerizable groups selected from the group consisting of acryloyl groups, vinyl groups, allyl groups, and combinations thereof.

12. The method of claim 1, wherein the polymerizable monomer composition comprises n-butyl acrylate and ethylene glycol dimethacrylate in a weight ratio of about 70:30 to about 99.8:0.2.

13. The method of claim 1, wherein the polymerizing the polymerizable monomer composition comprises using a technique selected from the group consisting of heating the polymerizable monomer, exposing the polymerizable monomer to ultraviolet light, exposing the polymerizable monomer to gamma radiation, exposing the polymerizable monomer to an electron beam, exposing the polymerizable monomer to x-rays, and combinations thereof.

14. The method of claim 1, wherein the polymerizing the polymerizable monomer composition comprises photopolymerizing the polymerizable monomer composition.

15. The method of claim 1, wherein the stabilized wrinkled surface has a buckling wavelength of about 50 nanometers to about 1,000 micrometers.

16. The method of claim 1, wherein the stabilized wrinkled surface exhibits a separation force, $P_s$, that is at least 90 percent repeatable over ten cycles of contact and separation of the stabilized wrinkled surface and a glass surface.

17. The method of claim 1, wherein formation of the wrinkled surface is a product of osmotic stress created by elastomer layer swelling and lateral confinement, optionally in combination with one or more of mechanical compression, light activation, and heat.

18. The method of claim 1,
wherein the laterally confined elastomer layer is laterally confined by adhesion of the elastomer layer to an underlying substrate, covalent bonding of the elastomer layer to an underlying substrate, or a combination thereof;
wherein the laterally confined elastomer layer is the product of photopolymerizing a composition comprising n-butyl acrylate and ethylene glycol dimethacrylate;
wherein the polymerizable monomer composition comprises n-butyl acrylate and ethylene glycol dimethacrylate in a weight ratio of about 90:10 to about 99.5:0.5;
wherein the polymerizing the polymerizable monomer composition comprises photopolymerizing the polymerizable monomer composition;
wherein the stabilized wrinkled surface has a buckling wavelength of about 250 to about 500 micrometers;
wherein the stabilized wrinkled surface exhibits a normalized separation strength, $\sigma_{s,n}$, of about 1.5 to about 4, wherein the normalized separation strength is measured using adhesion to a glass surface and normalized relative to adhesion of a smooth surface having the same composition as the stabilized wrinkled surface; and
wherein the stabilized wrinkled surface exhibits a separation force, $P_s$, that is at least 95 percent repeatable over ten cycles of contact and separation of the stabilized wrinkled surface and a glass surface.

19. A method of preparing a replicated wrinkled adhesive surface, comprising:
swelling a laterally confined elastomer layer with a polymerizable monomer composition, thereby forming a swollen elastomer layer comprising a wrinkled surface;
polymerizing the polymerizable monomer composition to stabilize the wrinkled surface; wherein the stabilized wrinkled surface exhibits a normalized separation strength, $\sigma_{s,n}$, greater than 1, wherein the normalized separation strength is measured using adhesion to a glass surface and normalized relative to adhesion of a smooth surface having the same composition as the stabilized wrinkled surface;
forming a template that is a three-dimensional negative of the stabilized wrinkled surface; and
using the template to mold a replicate wrinkled adhesive surface.

20. The method of preparing a replicated wrinkled adhesive surface of claim 19, wherein the forming a template comprises depositing a third polymerizable monomer composition on the stabilized wrinkled surface, polymerizing the third polymerizable monomer composition, and separating the polymerized third polymerizable monomer composition from the stabilized wrinkled surface.

21. The method of preparing a replicated wrinkled adhesive surface of claim 20, wherein the third polymerizable monomer composition comprises a mercapto-ester monomer.

22. The method of preparing a replicated wrinkled adhesive surface of claim 19, wherein the using the template to mold a replicate wrinkled adhesive surface comprises depositing a fourth polymerizable monomer composition on the template, polymerizing the fourth polymerizable monomer composition, and separating the polymerized fourth polymerizable monomer composition from the template.

23. The method of preparing a replicated wrinkled adhesive surface of claim 22, wherein the fourth polymerizable monomer composition comprises a monomer selected from the group consisting of alkenyl aromatic monomers, acrylate monomers, alkenyl ether monomers, and combinations thereof.

24. A method of controlling the adhesive properties of a wrinkled surface, comprising:

swelling a laterally confined elastomer layer with a polymerizable monomer composition, thereby forming a swollen elastomer layer comprising a wrinkled surface;

polymerizing the polymerizable monomer composition to stabilize the wrinkled surface; wherein the stabilized wrinkled surface exhibits a normalized separation strength, $\sigma_{s,n}$, greater than 1, wherein the normalized separation strength is measured using adhesion to a glass surface and normalized relative to adhesion of a smooth surface having the same composition as the stabilized wrinkled surface; and controlling an adhesive property of the wrinkled surface by varying at least one factor selected from the group consisting of thickness of the laterally confined elastomer layer, elastic constant (E*) of the laterally confined elastomer layer, adhesion energy ($G_c$) of the laterally confined elastomer layer.

25. The method of claim 1, wherein the laterally confined elastomer layer comprises a polymer selected from the group consisting of poly(alkyl (meth)acrylate)s, poly(conjugated diene)s, block copolymers of alkenyl aromatic monomers and conjugated dienes, polyacrylamides, polyethylene glycols, and combinations thereof.

26. The method of claim 19, wherein the laterally confined elastomer layer comprises a polymer selected from the group consisting of poly(alkyl (meth)acrylate)s, poly(conjugated diene)s, block copolymers of alkenyl aromatic monomers and conjugated dienes, polyacrylamides, polyethylene glycols, and combinations thereof.

27. The method of claim 24, wherein the laterally confined elastomer layer comprises a polymer selected from the group consisting of poly(alkyl (meth)acrylate)s, poly(conjugated diene)s, block copolymers of alkenyl aromatic monomers and conjugated dienes, polyacrylamides, polyethylene glycols, and combinations thereof.

* * * * *